US008317626B2

(12) United States Patent
Hill et al.

(10) Patent No.: US 8,317,626 B2
(45) **Date of Patent: *Nov. 27, 2012**

(54) INTER-GAME COMMUNICATIONS IN MULTI-MACHINE GAMING SYSTEM AND METHOD

(75) Inventors: Rodney E. Hill, Sparks, NV (US); Shawn G. Quick, Sparks, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/309,502

(22) Filed: Dec. 1, 2011

(65) Prior Publication Data

US 2012/0077598 A1 Mar. 29, 2012

Related U.S. Application Data

(63) Continuation of application No. 11/612,400, filed on Dec. 18, 2006, now Pat. No. 8,075,406.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl. ................ 463/42; 463/39; 463/40; 463/41; 463/43; 463/46

(58) Field of Classification Search ..................... 463/42
See application file for complete search history.

(56) References Cited

U.S. PATENT DOCUMENTS

| | | | | |
|---|---|---|---|---|
| 7,022,017 | B1 | 4/2006 | Halbritter et al. | |
| 8,075,406 | B2 | 12/2011 | Hill et al. | |
| 2001/0036865 | A1 | 11/2001 | Neal, III | |
| 2002/0147045 | A1 | 10/2002 | La Mura et al. | |
| 2002/0193162 | A1 * | 12/2002 | Walker et al. | 463/42 |
| 2003/0216183 | A1 | 11/2003 | Danieli et al. | |
| 2004/0248651 | A1 | 12/2004 | Gagner et al. | |
| 2007/0243935 | A1 | 10/2007 | Huizinga | |

FOREIGN PATENT DOCUMENTS

| | | | |
|---|---|---|---|
| JP | 2005-137812 | A | 6/2005 |
| JP | 2006-67105 | A | 3/2006 |

* cited by examiner

*Primary Examiner* — Michael Cuff
*Assistant Examiner* — Kevin Y Kim
(74) *Attorney, Agent, or Firm* — Steptoe & Johnson LLP

(57) ABSTRACT

The disclosed system and method provide a dynamic and scalable gaming system in which a plurality of gaming machines are connected to a network switch. The gaming switch has two sets of data ports configured into two virtual local area networks (VLANs). The gaming machines are connected through their network interfaces to a first set of data ports of the network switch to form a first VLAN. The gaming machines are connected through their serial interfaces and serial-to-network adapters to a second set of data ports of the network switch to form a second VLAN. The gaming machines are configured to communicate with devices external to the gaming network through their network interfaces. The gaming machines are configured to communicate with each other through their serial interfaces. External and internal communications within the gaming network are segregated both at the device and network levels.

48 Claims, 4 Drawing Sheets

INTER-GAME COMMUNICATIONS IN MULTI-MACHINE GAMING SYSTEM AND METHOD

CROSS REFERENCE TO RELATED APPLICATION

This patent application is a continuation of U.S. patent application Ser. No. 11/612,400, filed Dec. 18, 2006, which is incorporated herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF TECHNOLOGY

This disclosure generally relates to gaming, and in particular, to the systems and methods for inter-game communications in a multi-machine gaming environment.

BACKGROUND

Due to rapid advances in computer and software technologies, today's gaming industry offers a large variety of highly sophisticated and entertaining gaming options to the casino patrons. For example, a typical casino offers a variety of electronic wagering games, such as video and mechanical slots, video poker, blackjack video keno, video bingo, video pachinko, craps, roulette, and the like. These games are typically implemented as software applications that run on special-purpose computerized gaming machines. The gaming machines are, in turn, connected into gaming networks, such as an Internet Protocol (IP) based local or wide area networks. The size of such gaming networks frequently reaches several thousand gaming machines.

Often gaming networks utilize a hub-and-spoke topology, in which gaming machines are connected to one or more centralized gaming servers. The gaming server(s) manage and control operation of the gaming applications, as well as provide various services to the gaming machines, such as billing and user authentication services. The size of these gaming network and a large amount of network traffic generated by the gaming machines and servers in a gaming network having hub-and-spoke architecture can sometimes result in difficulties related to configuration, management, and resource allocation. Moreover, there can be inherent limitations that exist in this type of network architecture that sometimes impede the development of gaming applications that run across multiple gaming machines, particularly when attempting to provide highly dynamic and interactive gaming environment to casino patrons.

SUMMARY

Briefly, and in general terms, a networked gaming system is disclosed that comprises at least a first and second gaming machine, each including a network interface and a serial interface. The networked gaming system further comprises a network switch having two sets of data ports. The network interfaces of the first and second gaming machines are connected to a first set of data ports of the network switch. The serial interfaces of the first and second gaming machines are connected via serial-to-network adapters to a second set of data ports of the network switch. The first set of data ports of the network switch is configured to communicate with network devices external to the gaming network. The second set of data ports of the network switch is configured to communicate with network devices internal to the gaming network.

In one embodiment, the network devices connected to the first set of data ports are configured into a first virtual local area network (VLAN). The network devices connected to the second set of data ports are configured into a second VLAN. The network devices of the first VLAN are logically separated from the network devices of the second VLAN. The first VLAN is configured to communicate data between the first and second gaming machines and network devices external to the gaming network. The second VLAN is configured to communicate data between the first and second gaming machines. The second VLAN is configured to communicate data related to one or more gaming applications.

Another embodiment is directed towards a method for configuring a gaming network that includes a network switch and a plurality of gaming machines. The method comprises connecting network interfaces of the gaming machines to a first set of data ports of the network switch; configuring the first set of data ports of the network switch to communicate with network devices external to the gaming network; connecting serial interfaces of the gaming machines via serial-to-network adapters to a second set of data ports of the network switch; and configuring the second set of data ports of the network switch to communicate with network devices internal to the gaming network. Configuring the first set of data ports comprises assigning Internet Protocol (IP) addresses to devices connected to the first set of data ports.

In still another embodiment, networked gaming system is disclosed that comprises at least a first and second gaming machine, each including a first interface and a second interface. The networked gaming system further comprises a network switch having first set of data ports and a second set of data ports. The first interface of the first gaming machine and the first interface of the second gaming machine are connected to a first set of data ports of the network switch to form a first VLAN. The second interface of the first gaming machine and the second interface of the second gaming machine are connected to a second set of data ports of the network switch to form a second VLAN. The first set of data ports of the network switch is configured to communicate with network devices external to the gaming network. The second set of data ports of the network switch is configured to communicate with network devices internal to the gaming network.

In yet another embodiment, a gaming machine that provides gaming presentations to casino patrons comprises a memory, which stores one or more gaming applications, and a processor coupled to the memory, which executes one or more gaming applications. The gaming machine further comprises a video display that displays one or more executed gaming applications. The gaming machine includes a serial interface and a serial-to-network adapter connected thereto. The serial interface is configured by the processor and transmits data related to the executed gaming applications. The gaming machine also includes a network interface that is configured by the processor to transmit data unrelated to the executed gaming application. The serial interfaces include a Universal Serial Bus (USB) interface, FireWire interface, High-Speed Serial Interface (HSSIs), or combinations thereof. The serial-to-network adapters include USB-to-Ethernet adapters, USB-to-wireless adapters, or combinations thereof. The network interfaces include Ethernet interfaces, wireless interfaces, or combinations thereof.

Other features and numerous aspects of various embodiments will become apparent from the following detailed description when taken in conjunction with the corresponding drawings that illustrate, by way of example only, and not by way of limitation, the features of the disclosed embodiments.

DETAILED DESCRIPTION OF THE PREFERRED EMBODIMENTS

Figure 1:
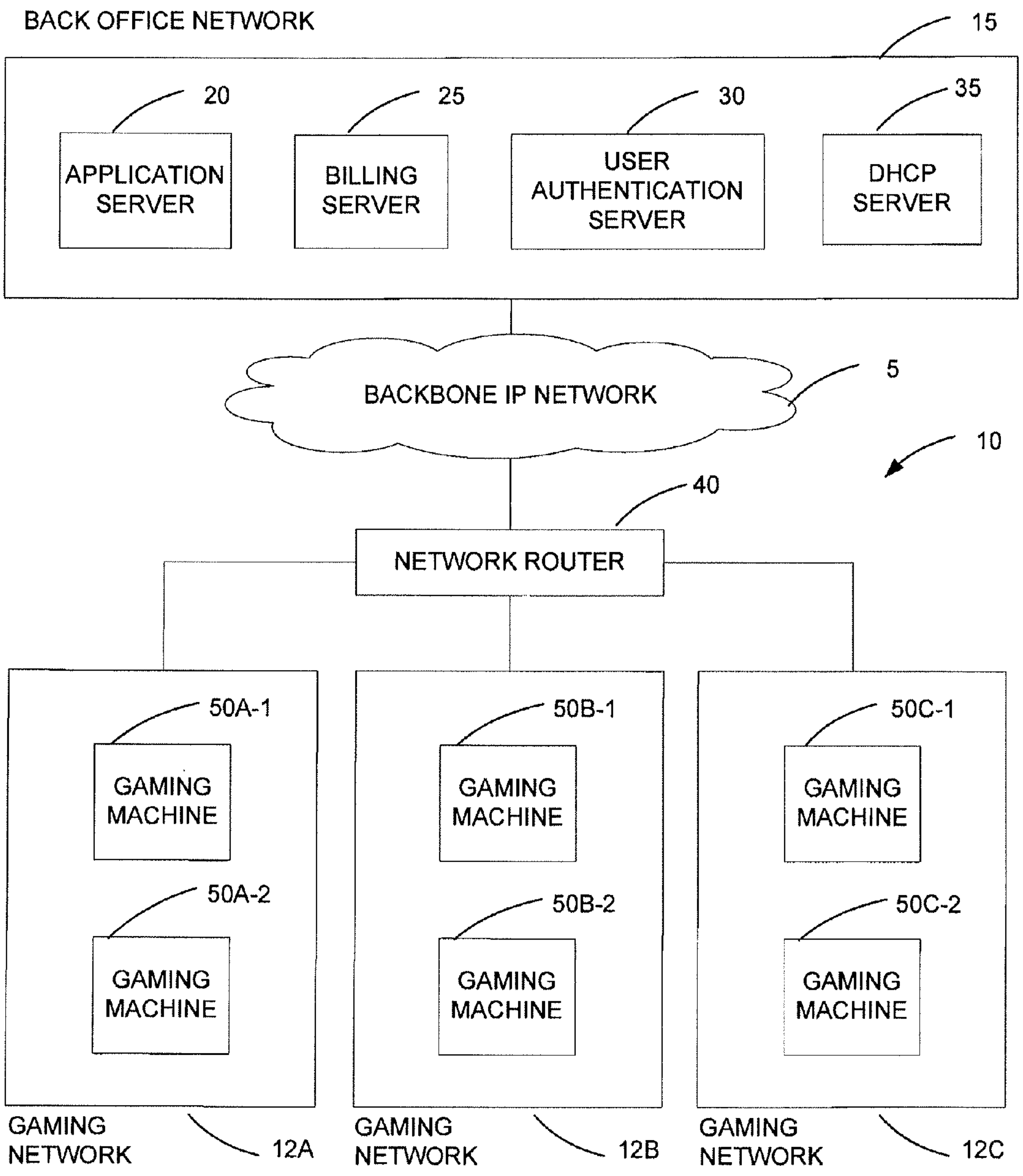
FIG. 1 illustrates a block diagram of a gaming system in accordance with one embodiment.
Figure 2:
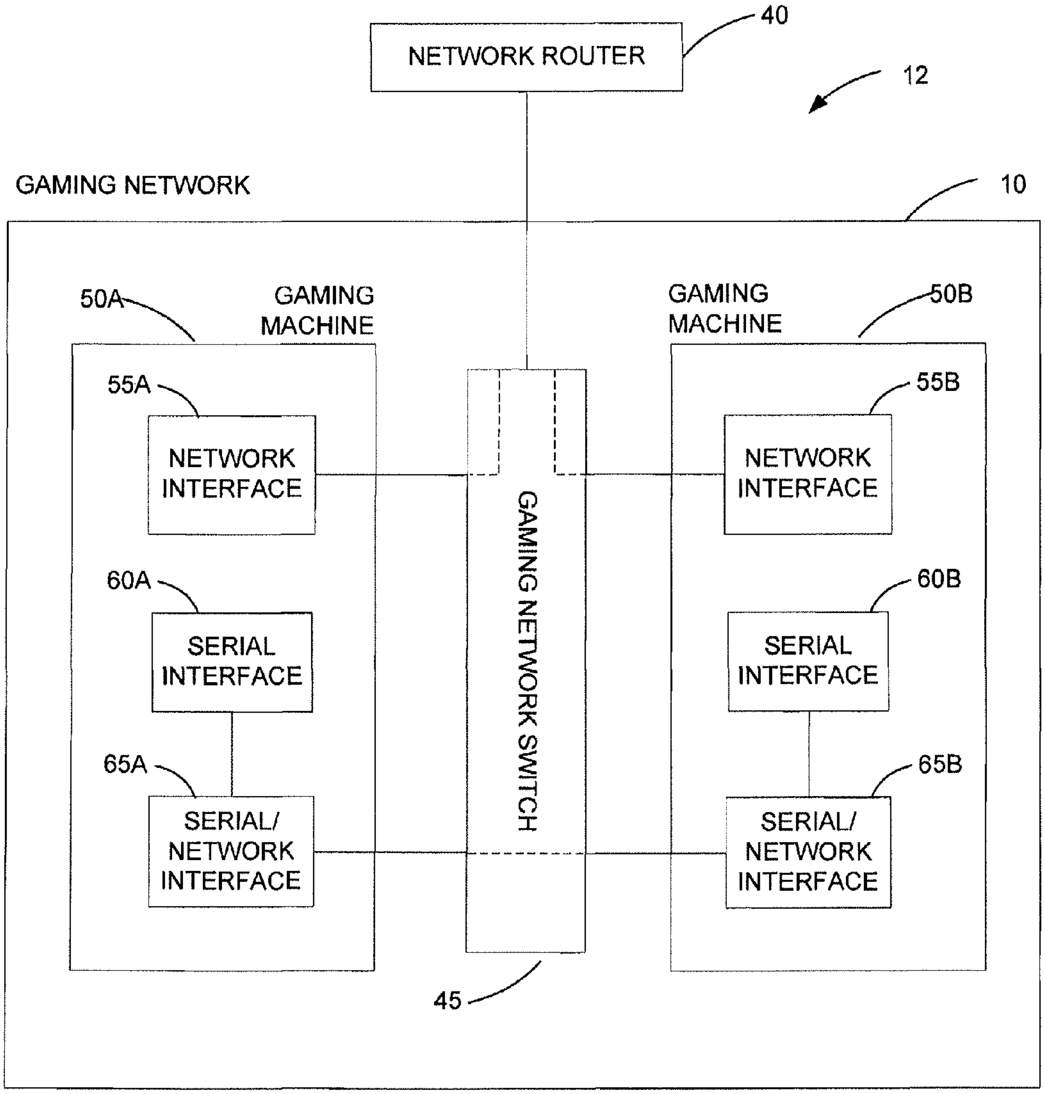
FIG. 2 illustrates a block diagram of a gaming system in accordance with other aspects of one embodiment.
Figure 3:
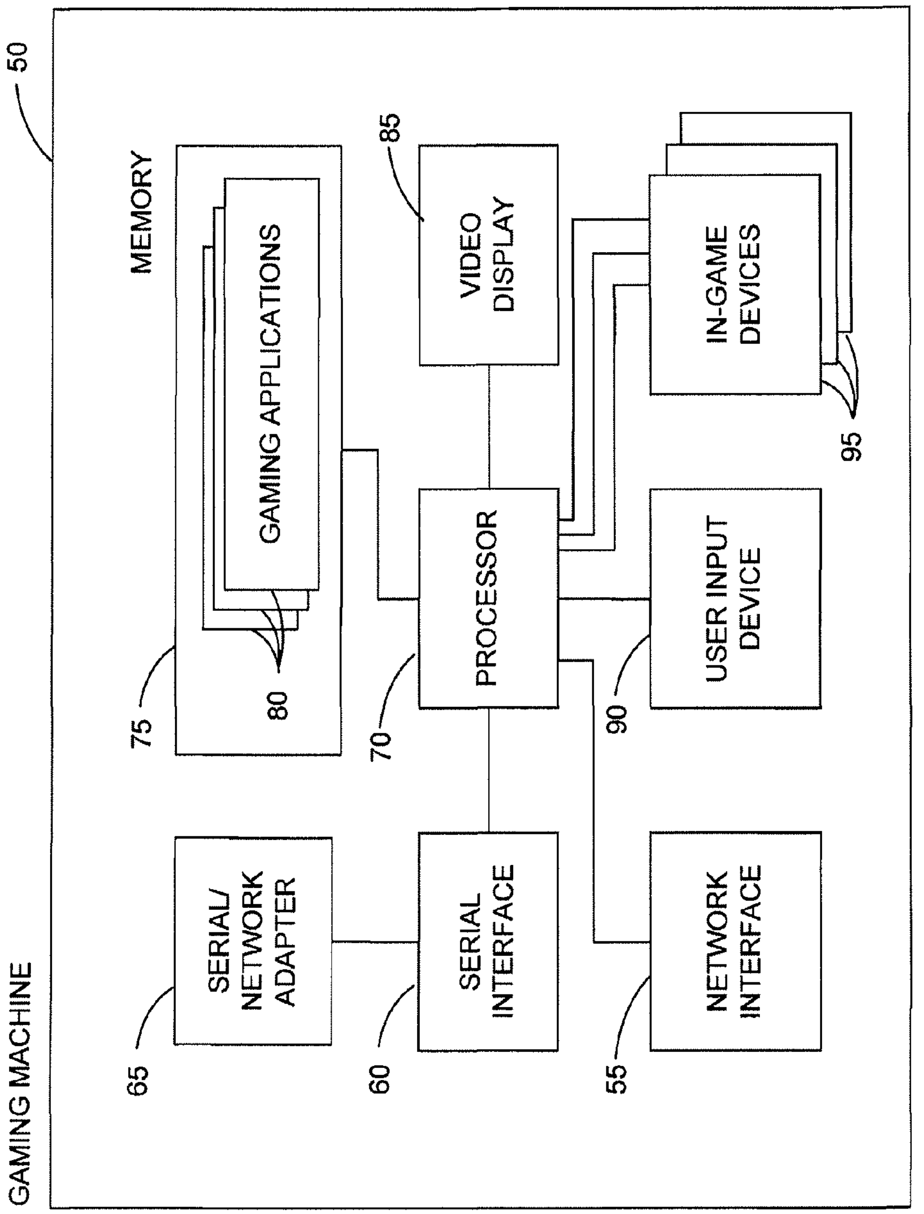
FIG. 3 illustrates a block diagram of a gaming machine in accordance with one embodiment.

Referring now to the drawings, wherein like reference numerals denote like or corresponding parts throughout the drawings and, more particularly to FIGS. 1-3, there are shown various embodiments of a networked gaming system and/or method. Specifically, as shown in FIG. 1, the networked gaming system may include one or more gaming networks 12 that each includes a plurality of gaming machines 50. In one embodiment, each gaming machine 50 contains programming logic, which may be embodied in hardware and/or software to facilitate presentation of one or more gaming applications, such as games of chance, to the casino patrons. In one embodiment, each gaming network 12 is a Local Area Network (LAN) that spans one or more casinos (or property locations of the same or affiliated casinos). The networked gaming system may further include a back office network 15 that includes a plurality of computer servers that facilitate operation of the networked gaming system, and its gaming networks 12. The gaming networks 12 may be connected to each other and to the back office network 15 through a network router 40 and via a broadband, IP-based backbone network 5, such as a Gigabit Ethernet, Asynchronous Transfer Mode ("ATM") network or the like.

In one embodiment, the back office network 15 may include various computer servers. For example, an application server 20 provides various content updates for the gaming machine 50, as well as facilitates monitoring of player wager information, player credits, winning events and the like. The back office network 15 may further include a billing server 25, which provides secure credit card processing services for players utilizing credit/debit cards at the gaming machine 50, as well as other billing and financial services, such as tracking of the cumulative jackpots across several gaming machines 50 and other services. The back office network 15 may further include a user authentication server 30 that maintains information about casino patrons. This information may be used to monitor patrons' winnings/rewards and to provide various personalized services to the casino patrons. The back office network 15 may also include a DHCP Server 35 that provides networking information, such as IP address scope, to the devices in the gaming network 12 using Dynamic Host Configuration Protocol (DHCP) or the like. The configuration of the back office network 15 is not limited to the one described above. Those of skill in the art will appreciate that the back office network 15 may include other servers and various network devices, such as routers and bridges, which facilitate operation of the networked gaming system.

In one embodiment, the networked gaming system may include a network router 40 or a similar networking device, which connects gaming networks 12 to the back office network 15 and facilitates data communication between the gaming machines 50 and gaming servers. In one embodiment, the router 40 may include Cisco Systems® 800 Series routers, Netgear® routers and the like. The gaming networks 12 may be connected to the network router 40 using, for example, wired IEEE 802.3 connections (also known as Ethernet), wireless IEEE 802.11 interface (also known as Wi-Fi) or similar IP-based network interfaces. In one embodiment, the router 40 may be configured based on information provided by the DHCP server 35 during system startup. In another embodiment, the router 40 may be manually configured by the system administrator. By way of example only, and not by way of limitation, the router 40 may be configured to assign IP addresses to be used by the gaming machines 10 in each gaming networks 12. Additionally, the router 40 may be configured to provide various network and device configuration information to the gaming machines 50, such as gateway server location, network addresses, clock synchronization information, content updates and other services. Furthermore, the network router 40 may be configured to route data packets between gaming machines 50 and back office network servers using routing tables stored therein. Generally, the router 40 facilitates communication between devices within each gaming network 12 and network devices external to a given gaming network.

As depicted in FIG. 2, the gaming network 12 may include a network switch 45 and a plurality of gaming machines 50 connected thereto. The gaming machines 50 may be physically or logically distributed between one or more casinos based on the type of gaming applications, manufacturers, or other parameters known to those of skill in the art. The gaming machines 50 may also be physically organized into a LAN or logically into one or more Virtual LANs ("VLAN"). In one embodiment, each gaming machine 50 contains programming logic, which may be embodied in the hardware and/or software, to facilitate presentation of gaming applications to the casino patrons. In one embodiment, a single gaming machine 50 may provide several different gaming applications. In another embodiment, a gaming application may run across several gaming machines 50 within a single gaming network 12. The gaming machine 50 may execute various gaming applications, such as video slots, mechanical slots, video poker, video blackjack, video keno, video bingo, video pachinko, as well as computerized table games, such as poker, blackjack, craps, roulette, and the like. In one embodiment, the gaming machine 50 may comprise video gaming machines manufactured by Bally Technologies, Inc. or other manufacturers.

FIG. 3 illustrates one embodiment of a gaming machine 50. As depicted, the gaming machine 50 comprises a microprocessor 70 and non-volatile memory 75 that stores one or more gaming applications 80, which are run by the microprocessor 70. The gaming machine 50 further includes a video display 85, such as an LCD display, through which the gaming applications are presented to the casino patrons. The gaming machine 50 may further include a user input device 90, such as a keyboard or various game-specific buttons (e.g., bet one, bet all and the like). In one embodiment, the user input device 90 may include a touch screen. In some embodiments, the touch screen overlays the video display 85. The gaming machine 50 may also include various in-game devices 95, such as credit card readers, coin and bill acceptors, casino patron card readers, and the like. In one embodiment, an in-game device 95 may comprise an embedded additional user interface (not depicted), such as an IVIEW interface described in the commonly owned U.S. patent application Ser. No. 10/943,771, entitled USER INTERFACE SYSTEM AND METHOD FOR A GAMING MACHINE, which is incorporated by reference herein. In one embodiment, the gaming machine 50 also includes a network interface 55 and a serial interface 60, which may be connected to a serial-to-network adapter 65, purpose of which will be described in greater detail hereinbelow.

As indicated above, the gaming machine 50 comprises network interface 55, such as a network card, which facilitates IP-based communication with other networked devices. In a preferred embodiment, the network interface 55 may be operative under the control of the processor 70 to communicate with devices external to the gaming network 12, such as back office network servers, through network switch 45 and router 40, as will be described in greater detail below. For example, the network interface 55 may be used to download gaming applications or updates thereto from the application server 20. The network interface 55 may also be used to communicate with the billing server 25 when casino patrons place wagers using credit or debit cards. In another example, the network interface 55 may be configured to communicate with user authentication server 30, which maintains information about casino patrons. This information may be used to monitor patrons' winnings and rewards and to provide various personalized services to the casino patrons. In yet another example, the network interface 55 may be used by "in game" devices, such as the IVIEW interface, to communicate with external computers servers, which provide advertisements and promotions-related information that is displayed on the IVIEW interface. The network interface 55 may be used for other purposes known to those of skill in the art.

As indicated above, the gaming machine 50 also includes a serial interface 60, such as a Universal Serial Bus (USB), FireWire, High-Speed Serial Interface (HSSI), or the like. In a preferred embodiment, the serial interface 60 may be under the control of the processor 70 and communicate with devices internal to the gaming network 12, such as other gaming machines 50. In a particular embodiment, the serial interface 60 may be dedicated to intra and inter-game communications, such as communications among gaming applications that run across several gaming machines 50 in the gaming network 12. For example, the serial interface 60 may be used by the gaming applications in a progressive networked gaming system in which several gaming machines 50 in a gaming network 12 compete for, and contribute to, a single jackpot price. In this networked gaming system, the gaming applications 80 may use serial interface 60 to exchange messages for synchronizing jackpot values, notify each other about winnings, and exchange other game-related information. In another embodiment, gaming applications 80 may communicate through serial interfaces 60 to set up group plays or tournaments across several gaming machines 50. Those of skill in the art will appreciate that there may be other applications of the serial interfaces 60.

To facilitate communication between the gaming applications 80 through the serial interfaces 60, the gaming machines 50 may be further equipped with serial-to-network adapters 65. For example, a serial-to-network adapter may include USB-to-Ethernet adapter, such as Netgear® USB 2.0 Fast Ethernet Adapter, or a USB-to-Wireless adapter, such as Lynksys® Wireless-G USB Network Adapter, or other types of adapters known to those of skill in the art. In one embodiment, the gaming machines 50 may be connected through their serial interfaces 60 and adapters 65 to a networking device, such as the aforementioned network switch 45. In another embodiment, another networking device, such as switch or a router may be used to interconnect gaming machines 50 through their serial interfaces 60. Furthermore, to communicate through the serial-to-network interfaces, the gaming applications 80 may use a custom network protocol, such as one based on Universal Datagram Protocol (UDP), Transmission Control Protocol (TCP), or other network protocols known to those skilled in the art.

Referring again to FIG. 2, in one embodiment the gaming network 12 may include a network switch 45 or a similar networking device that facilitates data communication between gaming machines 50 and networking devices external to the gaming network 12. To that end, the network switch 45 may be connected to the network router 40. The switch 45 may be implemented as programmable hardware or software network device, such as a switch, a router, an access point, or the like. In a preferred embodiment, the switch 45 may have an OSI Layer 2 (i.e., data link) and/or Layer 3 (i.e., network layer) switching capability. In addition, the switch 45 may support DHCP, BOOTP, or similar IP address distribution protocols, as is described in greater detail below. In one embodiment, the in-game switch 60 includes a hardware-based network switch that supports DHCP, such as 3Com® 8800 series switches, Cisco Systems® Catalyst switches, Netgear® switches, Lynksys® switches, or the like. In an alternative embodiment, the in-game switch 60 may be implemented as a software component stored in the non-volatile memory of one of the gaming machines 50 in the gaming network 12.

In a preferred embodiment, the network switch 45 includes twice as many data ports as there are gaming machines 50 in the give gaming network 12. In the event, a single switch does not have the sufficient number of data ports, additional switches may be connected to the switch 45 to provide the required number of data ports. In one embodiment, the data ports of the network switch 45 may be individually programmed to configure gaming machines connected thereto into one or more Virtual LANs (VLAN). Thus, in one embodiment, network devices connected to one set of data ports of the network switch 45 may be configured into a first VLAN and network devices connected to another set of data ports may be configured into a second VLAN. The first and second VLAN may be logically separated from each other and have independent data communication policies. As a result, data communications between network devices on the first VLAN may not be visible to the network devices on the second VLAN, thereby ensuring isolation and security of the two VLANs.

Referring again to FIG. 2, the gaming machines 50 may be connected to the network switch 45 in the following manner. In one embodiment, the gaming machines 50 may be connected through their network interfaces 55 to the first set of data ports of the network switch 45, thus forming a first VLAN. As indicated above, the network interfaces 55 may be configured to communicate with devices external to the gaming network 12, such as back office network servers. Therefore, the first set of data ports may be configured to direct all communications from the network interfaces 55 to the network router 40 and subsequently to the back office network servers. Otherwise stated, all communications from the external network devices, such as network servers, may be directed by the network switch 45 to the first set of data ports to which the gaming machines 50 are connected through their network interfaces 55. Accordingly, the first VLAN is dedicated to "external" communications.

Moreover, the gaming machines 50 may also be connected through their serial interfaces 60 via serial-to-network adapters 65 to the second set of data ports of the network switch 45, thus forming a second VLAN. As indicated above, the serial interfaces 60 are configured to communicate with devices internal to the gaming network 12, such as other gaming machines. Therefore, the second set of data ports may be configured to direct all communications from the serial interfaces 60 via serial-to-network adapters 65 to the network devices connected to second set of data ports. Furthermore, the second set of data ports may be configured not to accept any incoming or outgoing external communications. Accordingly, the second VLAN may be dedicated to "internal" or game-related communications only. Thus, the internal and external data communications are separated from each other both at the device and network levels.

In one embodiment, the network switch 45 may be configured to assign IP addresses to the network devices connected thereto. The IP address information may be provided to the network switch by the DHCP server 35 during system startup according to one embodiment. In another embodiment, the switch 45 may be manually configured by the system administrator with a default set of IP addresses. More specifically, the DHCP server 35 may transmit an IP address scope to the network switch 45 using, for example, DHCP, BOOTP or similar IP address distribution protocol. From the received IP address scope, the network switch 45 may assign IP addresses to the network devices connected to the first set of data ports and to the network devices connected to the second set of data ports. Alternatively, the network switch may assign default IP addresses to the network devices connected thereto. Using the assigned IP addresses, the gaming machines 50 may communicate with the external network devices through the network interfaces 55, and with each other through the serial interfaces 60.

Figure 4:
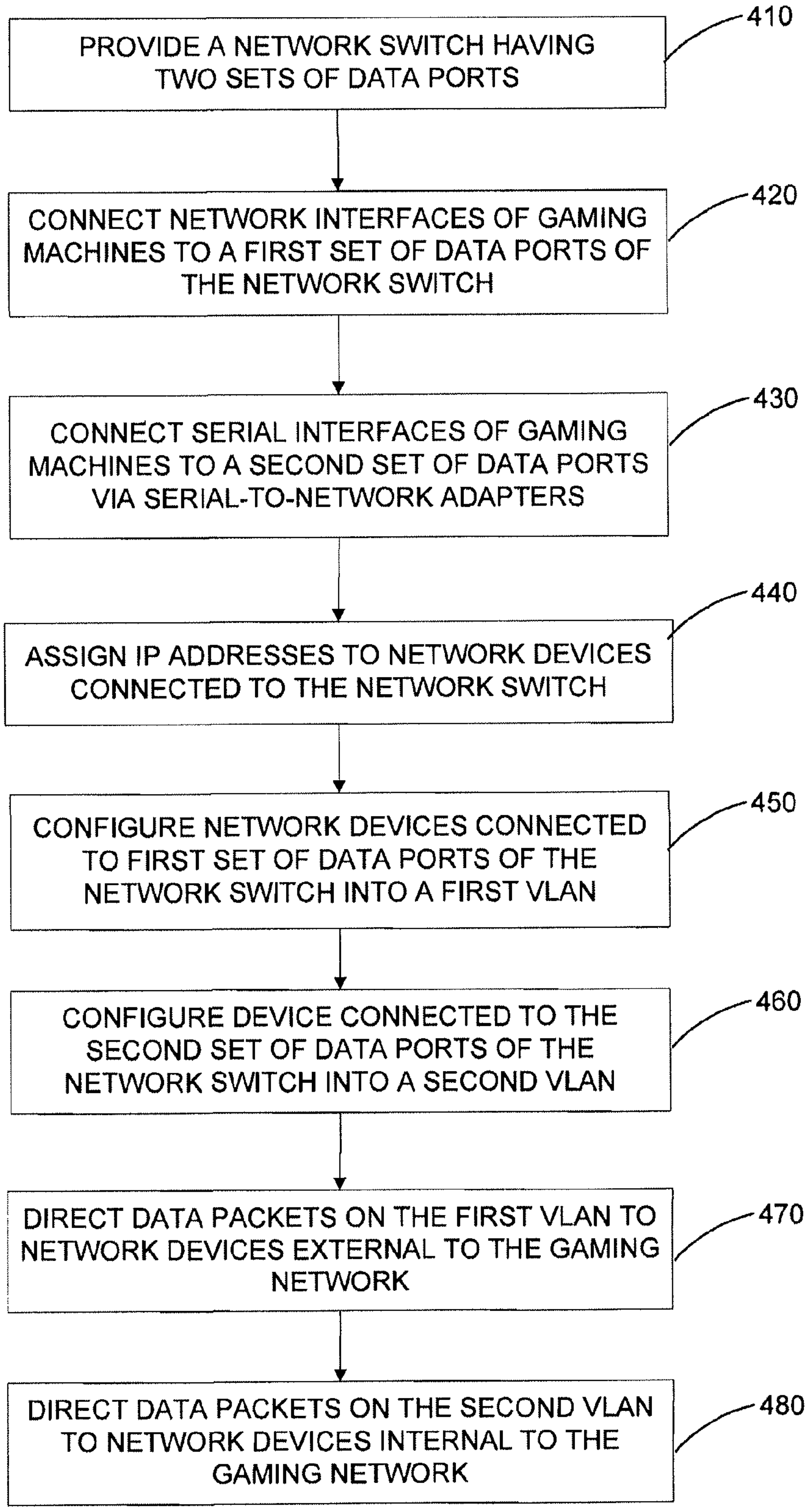
FIG. 4 illustrates a flow diagram of method for configuring a gaming network in accordance with one embodiment.

FIG. 4 illustrates a flow diagram of method for configuring a gaming network having a plurality of gaming machines in accordance with one embodiment. In step 410, a network switch is provided into the gaming network. The switch may have two sets of data ports, which can be independently configured. Each gaming machine may be connected through its network interfaces to the first set of data ports of the network switch, step 420. Then, each gaming machine may be connected through its serial interface and serial-to-network adapters to the second set of data ports of the network switch, step 430. The switch may then be configured to assign IP addresses to the network devices connected to its data ports, step 440. The first and second sets of data ports of the network switch may then be configured into first and second VLANs, steps 450 and 460, so that devices connected to the first and second data ports are logically separated from each other. The first set of data ports may then be configured to direct all communication from the device in first VLAN to the devices external to the gaming network, step 470. The second set of data ports may in turn be configured to direct all communications on the second VLAN to the devices internal to the gaming network, step 480.

In summary, the disclosed systems and methods provide a dynamic and scalable networked gaming system, in which a plurality of gaming machines are connected to a network switch to form a hybrid peer-to-peer gaming network. The gaming switch has two sets of data ports configured into two VLANs. The first set of data ports is connected to the network interfaces of the gaming machine to form a first VLAN. The second set of data interfaces is connected via serial-to-network adapters to the serial interfaces of the gaming machines to form a second VLAN. The first VLAN may be dedicated to communications with devices external to the gaming network. The second VLAN may be dedicated to communications with devices internal to the gaming network. Thus, all server communications may be conducted on the first VLAN, and all game-related communications may be conducted on the second VLAN. The resulting hybrid peer-to-peer gaming network is highly secure and readily scalable. First, external and internal communications are segregated both at the device level and at the network level, which ensures security of the data transmissions. Second, the gaming network may be easily scaled by adding additional gaming machines and network switches to the network. Moreover, this network configuration simplifies both system and network resource allocation and facilitates implementation of highly complex gaming applications that can run across several gaming machines.

A preferred embodiment is directed towards a dynamic and scalable gaming system that includes a plurality of gaming machines connected into one or more hybrid peer-to-peer local-area gaming networks. Each gaming network may be dedicated to one or more gaming applications. For example, there may be a gaming network of blackjack dedicated gaming machines, a gaming network of craps-dedicated gaming machines, a gaming network of roulette gaming machines, and the like. These gaming networks may generally be autonomous and may be independently configured and managed. For example, within each network, the gaming machines may be configured into a master-slave configuration, with one machine acting as a master to the remaining slave machines. This architecture facilitates execution of gaming applications that run across several gaming machines, such as group plays, tournaments and progressive gaming applications.

To further facilitate execution of multi-machine gaming applications in a casino environment, gaming machines within each network are preferably able to directly communicate with each other. To that end, in a preferred embodiment, the gaming machines within each gaming network communicate with each other through their serial interfaces, such as a universal serial bus (USB) interface, rather than through their network interfaces, which may be dedicated to communication with network devices external to the given gaming network, e.g., gaming servers. Using serial interfaces for intra-game communications enables a gaming application to exercise full control over serial interfaces, thereby simplifying system programming. In addition, serial interfaces may be dedicated to intra-game communications, which simplifies system resource allocation. Moreover, by not using network interfaces, the gaming applications do not consume network resources and do not generate application-related network traffic outside the gaming network.

Preferably, each gaming machine includes a serial-to-network adapter, such as USB-to-Ethernet adapter, which may be connected to the serial interface of the gaming machine in order to facilitate networking of the gaming machines through serial interfaces. The network ends of the adapters may be connected to a first set of data ports of the network switch or similar networking device. The switch may be configured to organize gaming machines connected to the first set of data ports into a first virtual local area network (VLAN) dedicated to internal communications. In one embodiment, the network switch may be configured to manage and distribute "internal" IP addresses to the gaming machines connected to the first set of data ports. The gaming machines may use internal IP addresses to exchange game-related information with each other. The resulted peer-to-peer gaming network is highly secure because it is dedicated to communication of game-related information. In addition, the network is readily scalable to accommodate additional gaming machines that can be connected to the network switch.

As indicated above, the network interfaces of the gaming machines may be used to communicate with network devices external to the gaming network, such as various remote computers servers. To that end, the network interfaces of the gaming machines may be connected to a second set of data ports of the network switch or to another networking device, which would configure gaming machines into a second VLAN dedicated to external communications. In one embodiment, the network switch may be configured to manage and distribute "external" IP addresses to the gaming machines to be used for communicating with devices external to the gaming network. In this manner, all internal and external data communications on the gaming network are separated from each other both at the device and network level, which simplifies resource allocation and improves security of the system.

Furthermore, the various embodiments described above are provided by way of illustration only and should not be construed to limit the disclosed embodiments. Those skilled in the art will readily recognize various modifications and changes that may be made to the disclosed embodiments without following the example embodiments and applications illustrated and described herein, and without departing from the true spirit and scope of the disclosed embodiments, which is set forth in the following claims.

What is claimed:

1. A method for configuring a gaming network comprising a network switch and a plurality of gaming machines, wherein the network switch includes a first set of data ports and a second set of data ports, and wherein the gaming machines each include a network interface and a serial interface, the method comprising:

providing a networked gaming system in which the plurality of gaming machines are connected to the network switch, wherein the network interfaces of the gaming machines are connected to the first set of data ports of the network switch, wherein the network switch includes at least twice as many data ports as there are gaming machines in the gaming network, and wherein the serial interfaces of the gaming machines are connected via serial-to-network adapters to the second set of data ports of the network switch;

generating a first virtual local area network by configuring the first set of data ports of the network switch to communicate with network devices external to the gaming network;

generating a second virtual local area network by configuring the second set of data ports of the network switch to communicate with network devices internal to the gaming network; and facilitating execution of multi-machine gaming applications in a casino environment, wherein the gaming applications communicate through a virtual local area network to set up games across several gaming machines, wherein gaming machines within each virtual local area network are able to directly communicate with each other.

2. The method of claim 1, wherein configuring the first and second sets of data ports comprises: assigning Internet Protocol addresses to devices connected to the first and second sets of data ports.

3. The method of claim 2, further comprising: configuring network devices connected to the first set of data ports of the network switch into a first virtual local area network.

4. The method of claim 3, further comprising: configuring network devices connected to the second set of data ports of the network switch into a second virtual local area network.

5. The method of claim 4, wherein the network devices connected to the first virtual local area network and the network devices connected to the second virtual local area network are logically separate from each other.

6. The method of claim 5, wherein one or more gaming machines in the gaming network run one or more gaming applications.

7. The method of claim 6, wherein the one or more gaming applications include a game of chance.

8. The method of claim 6, wherein the second virtual local area network is dedicated to communicating information related to the one or more gaming applications.

9. The method of claim 1, wherein the network interface of each gaming machine includes an Ethernet interface, a wireless interface, or combinations thereof.

10. The method of claim 1, wherein the serial interface of each gaming machine includes a Universal Serial Bus (USB), FireWire, High-Speed Serial Interface (HSSI), or combinations thereof.

11. The method of claim 1, wherein the serial-to-network adapters comprises USB-to-Ethernet adapters, USB-to-wireless adapters, or combinations thereof.

12. The method of claim 1, further comprising: connecting the network switch to a network router.

13. The method of claim 12, further comprising: configuring the network router to communicate with network devices connected to the first set of data ports of the network switch and the devices external to the gaming network.

14. The method of claim 13, wherein the devices external to the gaming network include one or more computers servers.

15. The method of claim 14, wherein the one or more computer servers include one or more of an application server, a billing server, a user authentication server, and a DHCP server.

16. A gaming network, the network comprising:

a networked gaming system in which the plurality of gaming machines are connected to the network switch;

a first gaming machine including a network interface and a serial interface;

a second gaming machine including a network interface and a serial interface;

a network switch including a first set of data ports and a second set of data ports, wherein the network interfaces of the first and second gaming machines are connected to the first set of data ports of the network switch to generate a first virtual local area network, and the serial interfaces of the first and second gaming machines are connected via serial-to-network adapters to the second set of data ports of the network switch to generate a second virtual local area network; and multi-machine gaming applications stored on the gaming machines, wherein the multi-machine gaming applications are executed in a casino environment, wherein gaming applications communicate through a virtual local area network to set up games across several gaming machines, wherein gaming machines within each virtual local area network are able to directly communicate with each other.

17. The network of claim 16, wherein the first set of data ports of the network switch is configured to communicate with network devices external to the gaming network.

18. The network of claim 17, wherein the second set of data ports of the network switch is configured to communicate with network devices internal to the gaming network.

19. The network of claim 18, wherein configuring the first and second sets of data ports of the network switch comprises assigning Internet Protocol addresses to the connected network devices.

20. The network of claim 19, wherein the network devices connected to the first set of data ports are configured into a first virtual local area network.

21. The network of claim 20, wherein the network devices connected to the second set of data ports are configured into a second virtual local area network.

22. The network of claim 21, wherein the network devices of the first virtual local area network are logically separated from the network devices of the second virtual local area network.

23. The network of claim 22, wherein the first virtual local area network transmits data between (i) the first gaming machine and the network devices external to the gaming network, and (ii) the second gaming machine and the network devices external to the gaming network.

24. The network of claim 23, wherein the second virtual local area network transmits data between the first and second gaming machines.

25. The network of claim 24, wherein the second virtual local area network transmits data related to one or more gaming applications.

26. The network of claim 16, wherein the network interfaces of the first and second gaming machines include Ethernet interfaces, wireless interfaces, or combinations thereof.

27. The network of claim 26, wherein the serial interfaces of the gaming machines include Universal Serial Bus (USB), FireWire, High-Speed Serial Interface (HSSI), or combinations thereof.

28. The network of claim 16, wherein the serial-to-network adapters include USB-to-Ethernet adapters, USB-to-wireless adapters, or combinations thereof.

29. The network of claim 16, comprises a network router connected to the network switch.

30. The network of claim 29, wherein the network router is configured to communicate with the network devices connected to the first set of data ports of the network switch and devices external to the gaming network.

31. The network of claim 30, wherein the devices external to the gaming network include one or more computers servers.

32. The network of claim 31, wherein the one or more computer servers include an application server, a billing server, a user authentication server, a DHCP server, or combinations thereof.

33. A gaming network, the network comprising:

a networked gaming system in which the plurality of gaming machines are connected to the network switch;

a first gaming machine including a first interface and a second interface;

a second gaming machine including a first interface and a second interface; and a network switch including two sets of data ports, wherein the first interface of the first gaming machine and the first interface of the second gaming machine are connected to a first set of data ports of the network switch to form a first virtual local area network, and wherein the second interface of the first gaming machine and the second interface of the second gaming machine are connected to a second set of data ports of the network switch to form a second virtual local area network; and multi-machine gaming applications stored on the gaming machines, wherein the multi-machine gaming applications are executed in a casino environment, wherein gaming applications communicate through a virtual local area network to set up games across several gaming machines, wherein gaming machines within each virtual local area network are able to directly communicate with each other;

wherein the network switch is configured to manage and distribute external IP addresses to the gaming machines for communicating with devices external to the gaming network and with the other gaming machines.

34. The network of claim 33, wherein the first set of data ports of the network switch is configured to communicate with network devices external to the gaming network.

35. The network of claim 34, wherein the second set of data ports of the network switch is configured to communicate with network devices internal to the gaming network.

36. The network of claim 35, wherein configuring the first and second sets of data ports of the network switch comprises: assigning Internet Protocol addresses to the connected network devices.

37. The network of claim 36, wherein the first and second gaming machines run one or more gaming applications.

38. The network of claim 37, wherein the second virtual local area network is dedicated to communicating information related to the one or more gaming applications.

39. The network of claim 33, wherein the first interface of the first gaming machine and the first interface of the second gaming machine comprise network interfaces.

40. The network of claim 39, wherein the network interfaces include Ethernet interfaces, wireless interfaces, or combinations thereof.

41. The network of claim 33, wherein the second interface of the first gaming machine and the second interface of the second gaming machine comprise serial interfaces.

42. The network of claim 41, wherein the serial interfaces include Universal Serial Bus (USB), FireWire, High-Speed Serial Interface (HSSI), or combinations thereof.

43. The network of claim 41, wherein the serial interface of the first gaming machine and the serial interface of the second gaming machine are connected to the first set of data ports of the network switch via serial-to-network adapters.

44. The network of claim 43, wherein the serial-to-network adapters include USB-to-Ethernet adapters, USB-to-wireless adapters, or combinations thereof.

45. A gaming machine, wherein the gaming machine is connected to a networked gaming system having a plurality of gaming machines that are connected to the network switch, wherein the network switch includes a first set of data ports and a second set of data ports, the gaming machine comprising:

a memory having one or more gaming applications stored therein;

a processor coupled to the memory, wherein the processor executes the gaming applications;

a video display, wherein the video display presents an executed gaming application;

a serial interface, wherein the serial interface is connected via a serial-to-network adapter to the first set of data ports of the network switch, and wherein the serial interface is configurable by the processor to communicate data related to the executed gaming applications;

a network interface, wherein the network interface is connected to the second set of data ports of the network switch, and wherein the network interface is configurable by the processor to communicate data unrelated to the executed gaming application; and multi-machine gaming applications stored on the gaming machines, wherein the multi-machine gaming applications are executed in a casino environment, wherein gaming applications communicate through a virtual local area network to set up games across several gaming machines, wherein gaming machines within each virtual local area network are able to directly communicate with each other.

46. The gaming machine of claim 45, wherein the serial interfaces include Universal Serial Bus (USB) interface, FireWire interface, High-Speed Serial Interface (HSSIs), or combinations thereof.

47. The gaming machine of claim 46, wherein the serial-to-network adapters include USB-to-Ethernet adapters, USB-to-wireless adapters, of combinations thereof.

48. The gaming machine of claim 47, wherein the network interfaces include Ethernet interfaces, wireless interfaces; or combinations thereof.

* * * * *